Aug. 8, 1967   N. G. KLING   3,335,344

CAPACITANCE LIQUID-LEVEL DETECTOR

Filed Feb. 17, 1965

INVENTOR
NELSON G. KLING
BY
ATTORNEY

United States Patent Office 3,335,344
Patented Aug. 8, 1967

3,335,344
CAPACITANCE LIQUID-LEVEL DETECTOR
Nelson G. Kling, Ringwood, N.J., assignor to Technicon Instruments Corporation, Chauncey, N.J., a corporation of New York
Filed Feb. 17, 1965, Ser. No. 433,347
3 Claims. (Cl. 317—246)

This invention relates to apparatus for measuring the displacement of a liquid in a conduit, and, more particularly to a capacitor having a passageway therein for a liquid.

It is an object of this invention to provide an apparatus for measuring the displacement of a liquid in a conduit.

It is another object of this invention to provide an apparatus for measuring and remotely recording the displacement of a liquid in a conduit.

A feature of this invention is the provision of a pair of insulated metal plates disposed in a common plane with one edge of each plate adjacent to and spaced from the other edge to form a longitudinally extending gap, and a pair of insulated side plates, one on each side of the metal plates, to laterally close said gap to form a passageway between said four plates for a liquid, the capacitance between said two metal plates being a function of the displacement of the liquid in said passageway.

These and other objects, features and advantages of this invention will be apparent from the following detailed description taken in conjunction with the accompanying drawings in which.

Figure 2:
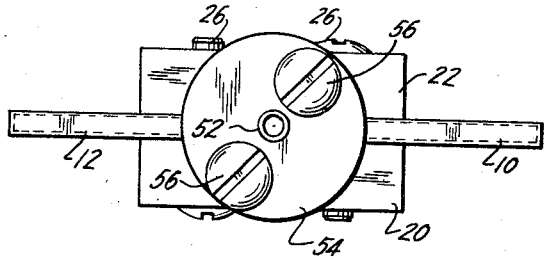
FIG. 2 is a view in plan of the apparatus of FIG. 1.
Figure 1:
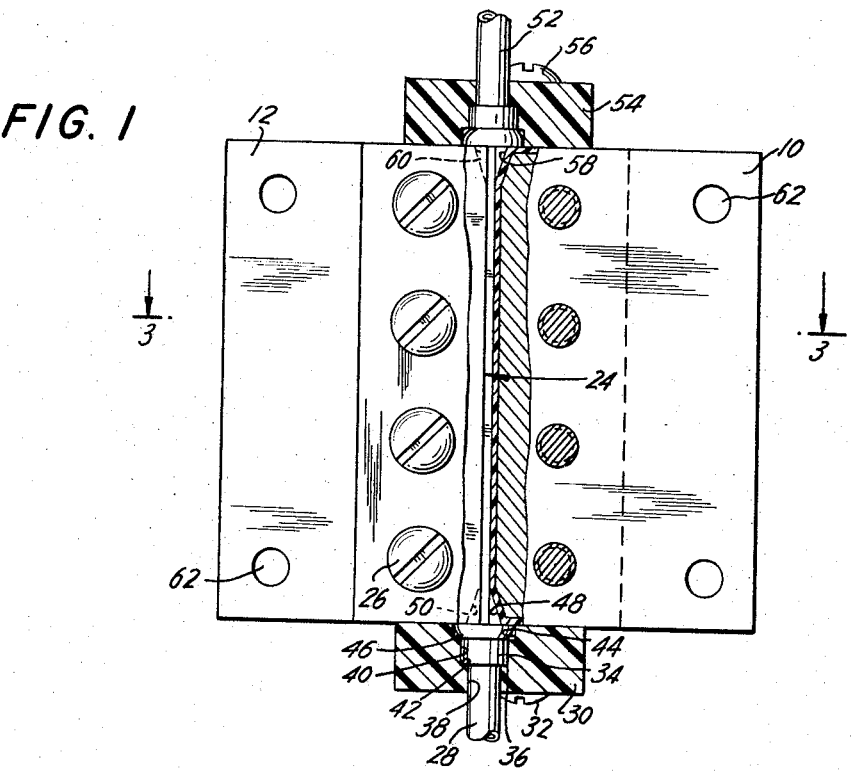
FIG. 1 is a view in front elevation, partially in section, of an apparatus embodying this invention.
Figure 3:
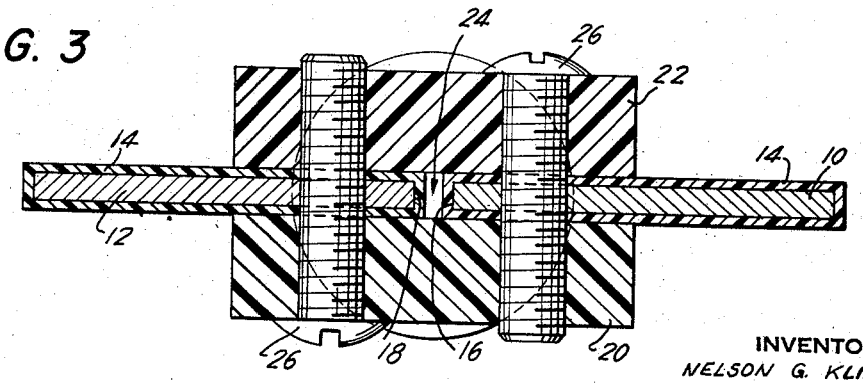
FIG. 3 is a view in cross-section, on an enlarged scale, taken along the plane 3—3 of FIG. 1.

The apparatus of this invention may be advantageously utilized with the viscosity measuring apparatus disclosed in the U.S. patent application of William J. Smythe and Morris H. Shamos, S.N. 434,714, filed concurrently herewith, and assigned to the assignee of this application. In that apparatus the displacement of a liquid, such as water, in a conduit, is measured as an indication of the viscosity of a sample liquid, such as blood. The apparatus of this invention is utilized as a portion of this conduit to measure the displacement of the second liquid therein.

As shown in the figures, the apparatus comprises a capacitor formed of two plates 10 and 12. Each of these plates is coated with a layer of insulation 14 having a non-wetting characteristic, such as "Teflon." The two plates are disposed in a common plane with the edge 16 of the plate 10 spaced from and parallel to the adjacent edge 18 of the plate 12.

Two side plates 20 and 22, each made of an insulator, such as an acrylic "Lucite," are disposed one on each side of the pair of metal plates 10 and 12 to laterally close the gap between these two metal plates to form a longitudinally passageway 24 between the four plates. The four plates are held and sealed together by a plurality of machine screws 26 arranged in two rows. The screws 26 may be made of an insulator, such as nylon.

A conduit 28 having an enlargement is clamped to the lower end of the passageway 24 by a clamping plate 30 which is secured to the insulator plates 20 and 22 by two machine screws 32. The conduit enlargement comprises a cylindrical portion 34 providing an external shoulder 36. The clamping plate 30 has a bore 38 with a first enlargement 40 providing a first internal shoulder 42 and a second enlargement 44 providing a second internal shoulder 46. The enlargement 34 may be made of a material having a limited amount of resiliency or may have a gasket, so that the first internal shoulder 42 engages the external shoulder 36 to seal the joint between the conduit 28 and the lower surface of the four plates forming the passageway 24. The lower corners 48 and 50 of the two edges 16 and 18 respectively are beveled to ensure continuity despite any misalignment between the bore of the conduit 28 and the passageway 24.

A conduit 52, a clamping plate 54, and two machine screws 56 are similarly provided for the upper end of the passageway. The upper corners 58 and 60 of the two edges 16 and 18 respectively are similarly beveled. The upper end of the conduit may be closed to provide an air trap above the passageway 24 as shown in the Smythe and Shamos patent application supra.

A plurality of holes 62 may be provided in each metal plate 10 and 12 for the insertion of terminal lugs to electrically connect the capacitor assembly to a capacitance measuring device such as a bridge.

In use, a quantity of gas, such as air, is trapped in the upper portion of the passageway 24 and the upper conduit 52; and a quantity of a second liquid, such as water, is trapped in the lower portion of the passageway 24 and the lower conduit 28. Increased upwardly directed pressure in the lower conduit 28 against the second fluid therein displaces the second fluid upwardly through the length of the passageway 24, compressing the trapped gas in the upper portion of the passageway 24 and the upper conduit 52. The increased quantity of second fluid in the passageway 24 changes the capacitance of the capacitor which is thus responsive to the displacement of the second fluid and the pressure causing the displacement.

While the preferred embodiment of the invention has been shown and described, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. A capacitor assembly comprising a pair of metal plates disposed in a common plane with one edge of each metal plate adjacent to and spaced from the other edge to form a longitudinally extending gap; and a pair of insulator side plates disposed one on each side of the metal plates to laterally close said gap to form a longitudinal passageway between said four plates for a liquid.

2. A capacitor assembly comprising a pair of metal plates disposed in a common plane with one edge of each metal plate adjacent to and spaced from the other edge to form a longitudinally extending gap; a pair of insulator side plates disposed one on each side of the metal plates to laterally close said gap to form a longitudinal passageway between said four plates for a liquid; a first conduit coupled to one end of said passageway; and a second conduit coupled to the other end of said passageway.

3. A capacitor assembly comprising a pair of insulation coated metal plates disposed in a vertical, common plane with one edge of each metal plate adjacent to and spaced from the other edge to form a vertically extending gap; a pair of insulator side plates disposed one on each side of the metal plates to laterally close said gap to form a vertically extending passageway between said four plates for a liquid; a chamber containing gas in fluid-flow coupling with the upper end of said passageway; a conduit containing liquid in fluid-flow coupling with the lower end of said passageway.

References Cited

UNITED STATES PATENTS 2,820,196  1/1958  Lindberg _____ 317—246

FOREIGN PATENTS 121,163  3/1946  Australia.

LARAMIE E. ASKIN, *Primary Examiner.*

E. GOLDBERG, *Assistant Examiner.*